March 24, 1970     G. O. WESTERLUND     3,502,444

REACTION VESSEL FOR LIQUIDS CONTAINING ENTRAINED GASES

Filed March 3, 1967     5 Sheets-Sheet 1

United States Patent Office 3,502,444
Patented Mar. 24, 1970

3,502,444
REACTION VESSEL FOR LIQUIDS CONTAINING ENTRAINED GASES
Gothe O. Westerlund, Vancouver, British Columbia, Canada, assignor to Chemech Engineering Ltd., Vancouver, British Columbia, Canada
Filed Mar. 3, 1967, Ser. No. 620,419
Claims priority, application Canada, Oct. 6, 1966, 972,276
Int. Cl. B01d 19/00
U.S. Cl. 23—285                                10 Claims

ABSTRACT OF THE DISCLOSURE

The vessel includes a main reaction chamber having liquor inlet means, liquor outlet means and gas outlet means. The vessel also includes both a surge tank and a gas collector. Means are provided which interconnect the surge tank to the liquor inlet to place main reaction chamber in direct liquid communication with the surge tank. Means are also provided which interconnect the gas collector and the gas outlet, to place the main reaction chamber in direct gaseous communication with the gas collector.

---

Figure 1:
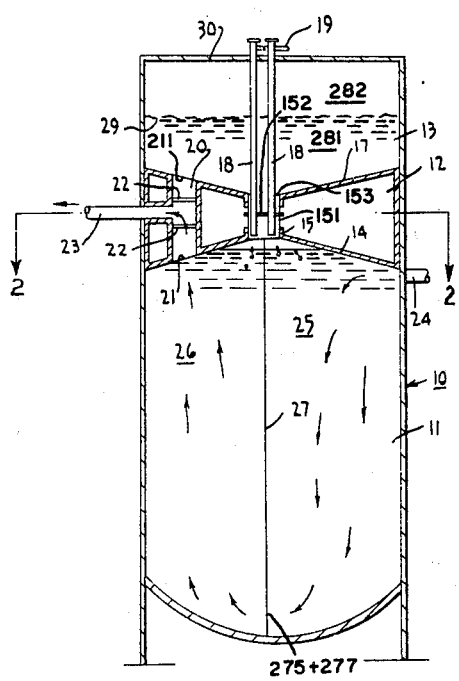

This invention relates to a novel reacting chamber, particularly one wherein a continuous process is being carried out, such process involving either the formation of a gas as one of the products of reaction, or the effecting thereof in the presence of a gaseous product transferred thereinto by entrainment or occlusion in the reactant liquor.

Many chemical procedures are known in which it is desired that reaction takes place in a reaction vessel for a particularly controlled length of time. This is easily done in a batch-type process. However, for a continuous process the length of time for the reaction to take place in a reaction vessel, or in other words the retention time is dependent on the flow rate of the reacting liquid. In many instances, particularly where the reaction vessel is coupled to another vessel where a further continuous reaction is taking place, it is inconvenient or impossible to vary the flow rate. In such instances, to provide sufficient retention time a very large reaction vessel, or a plurality of smaller vessels may have to be used. This is, of course, uneconomical.

Furthermore, where explosive gases are formed as a result of the reaction, or where such gases are transferred to the reaction vessel by entrainment or occlusion in the reactant liquor, means must be provided for removing the gases before hazardous conditions exist. In addition, where the volume of reactant liquor is coupled to the liquor output from another continuous reaction, the volume of liquor will fluctuate, consequently tending to increase the hazard accruing from the presence of the explosive gases.

An object of one broad aspect of the present invention is the provision of a reaction vessel which balances out fluctuations of liquor volume therethrough.

An object of a further aspect of the present invention is the collection and minimizing of the gases either formed as part of the chemical reaction, or present in the reaction vessel through entrainment or occlusion in the reactant liquor and thus minimize explosive hazards as well as enabling the recovery of any such gases which may be of further use.

An object of a subsidiary aspect of the present invention is the provision of a reaction vessel with means for maintaining a preselected retention time.

By a broad aspect of the present invention a vessel is provided for carrying out a chemical reaction in a liquid, wherein said liquid contains entrained or occluded gases, said vessel comprising (a) a main reaction chamber provided with (b) liquor inlet means (c) liquor outlet means and (d) gas outlet means; (e) a surge tank; (f) a gas collector; (g) means interconnecting said surge tank (e) and said liquor outlet (c) to place said main reaction chamber (a) in direct liquid communication with said surge tank (e); and (h) means interconnecting said gas collector (f) and said gas outlet (d) to place said main reaction chamber (a) in direct gaseous communication with said gas collector (f).

By another aspect of this invention the surge tank (e) is disposed at a vertical level higher than said main reaction chamber (a).

By yet another aspect of the present invention the surge tank (e) is supported at a vertical level higher than the main reaction chamber (a) and is spaced vertically therefrom in a unitary shell.

By yet another aspect of the present invention the gas outlet means includes an enclosed chamber disposed between the main reaction chamber (a) and the surge tank (e) and in direct gaseous communication with the main reaction chamber and communicating to gas collectors extending upwardly therefrom.

By yet another aspect of the present invention the surge tank (e) is disposed vertically above and is spaced horizontally from the main reaction chamber (a) and is in direct communication with the liquor outlet means (c).

By a preferred aspect of the present invention the main chamber is divided into two chambers by means of a centrally disposed baffle which channels the flow from the inlet by means (b) downwardly through the inlet compartment of said main chamber and then upwardly to the outlet compartment of said main chamber.

By a still further aspect of the present invention there are provided dividing walls to divide the main chamber into a primary inlet chamber, a primary outlet chamber and an even number of interconnected chambers connecting said primary inlet chamber to said primary outlet chamber and including at least a secondary inlet chamber and a secondary outlet chamber, the secondary inlet chamber being joined to the secondary outlet chamber and being in liquid relation therewith by header means at a location remote from the inlet means, the inter-connection providing inlet means for the secondary inlet chamber, the secondary inlet chamber being joined to an adjacent inter-connected chamber and being in liquid communication therewith by header means at a location remote from the secondary inlet chamber inlet means, the inter-connection providing inlet means to the adjacent chamber, each said inter-connected chamber being enjoined to each adjacent inter-connected chamber by header means at locations remote from the inlet means thereto, the secondary outlet chamber being joined to the primary outlet chamber and being in liquid communication therewith by header means at a location remote from the outlet means, the inter-connection providing inlet means to the primary outlet chamber.

By yet another aspect of the present invention the reaction chamber is provided with a sloping divider between the main chamber and the intermediate chamber, with the apex at the central core of said main chamber, the apex being disposed at an elevation higher than the inter-connecting means (d) between the main chamber and the upper surge chamber.

By yet another aspect of the present invention the divider between the intermediate chamber and the upper surge chamber is sloped with the apex at the central core of the vessel, the apex being at an elevation below the elevation of the inter-connecting means lower than the discharge outlet from the connecting means (d) between the main chamber and the upper surge chamber.

By yet another aspect of the present invention upstanding gas collector header pipes are provided extending upwardly from the intermediate chamber and terminating at an elevation above the top of said vessel.

By yet another aspect of the present invention the vessel is provided with a cover with a gas-tight cover over the upper surge chamber.

By yet another aspect of the present invention the chamber is provided with a suitable chemically resistant lining such as rubber, titanium, polyester, or glass.

A preferred use of the reaction vessel of one aspect of the present invention is in the process for the manufacture of chlorate, as disclosed and claimed in Canadian Patent No. 741,778 issued Aug. 30, 1966. That patent is concerned with the well-known procedure for the production of metal chlorates, particularly alkali metal chlorates. It is well-known that alkali metal chlorates may be prepared by electrolysis of an aqueous solution of an alkali metal chloride. In this process elemental chlorine is evolved at the anode and alkali metal hydroxide at the cathode. However, in the conventional cells, since there is no diaphragm between the cathode and the anode, the primary products of the electrolysis react to form the alkali metal chlorate.

The simplified reaction in the aforesaid electrolysis may be summarized as:

$$MtCl + 3H_2O + 6 \text{ Faradays} \rightarrow MtClO_3 + 3H_2$$
(wherein Mt is a metal)

The main reactions in the electrolytic preparation of the metal chlorate from the metal chloride may be represented as follows:

PRIMARY REACTIONS (A) at the anode:

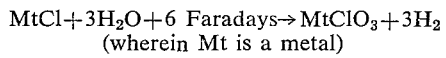

(1)

(B) at the cathode:

$$2H_2O \rightleftharpoons 2H^+ + 2OH^- + 2e^- \rightarrow H_2 + 2OH^-$$ (2)

SECONDARY REACTIONS (C) $\quad Cl_2 + OH^- \rightarrow ClOH + Cl^-$ (3)

$\quad ClOH \rightleftharpoons H^+ + OCl^-$ (4)

(D) $\quad 2ClOH + ClO^- \rightarrow ClO_3^- + 2Cl^- + 2H^+$ (5)

The secondary reactions are those whose efficiency depends on time, temperature and pH. Since the temperature and pH are constant, the optimum results can be achieved, in any one reaction vessel, by a maximum utilization of such vessel. It is important in such reaction to avoid short circuiting and channeling to maintain a constant reaction or retention time. The reaction vessel of one aspect of the present invention is designed admirably to achieve such object.

Figure 2:
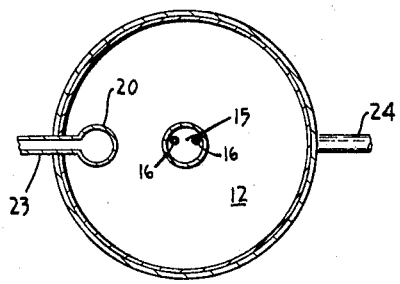
Figure 3:
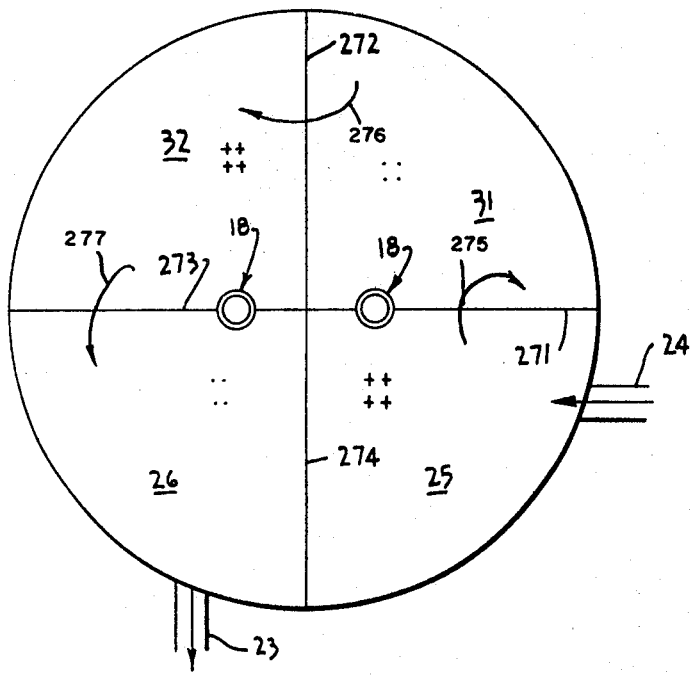
Figure 4:
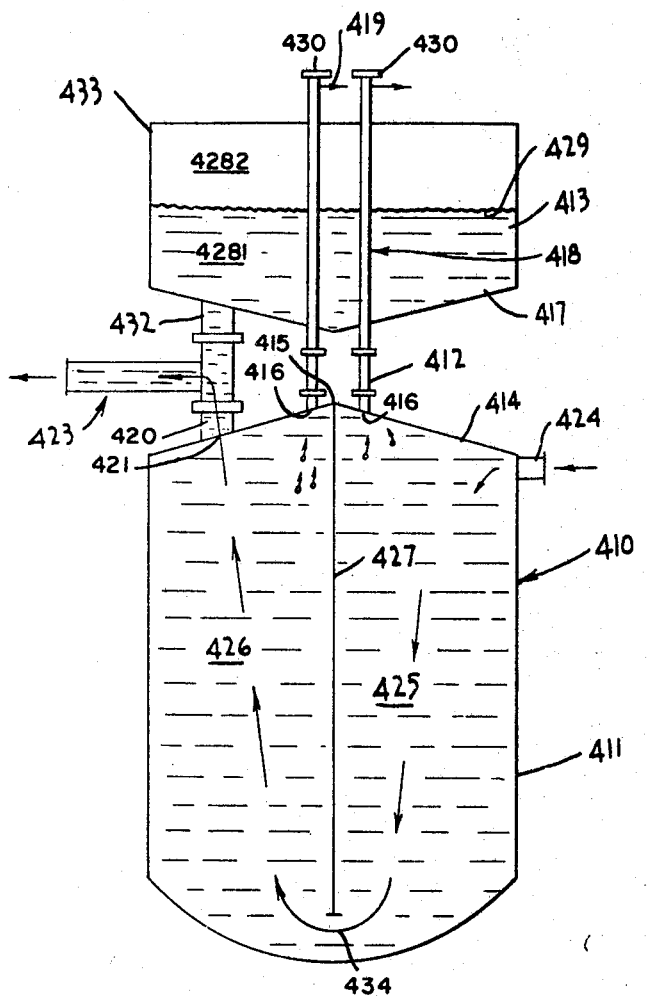
Figure 5:
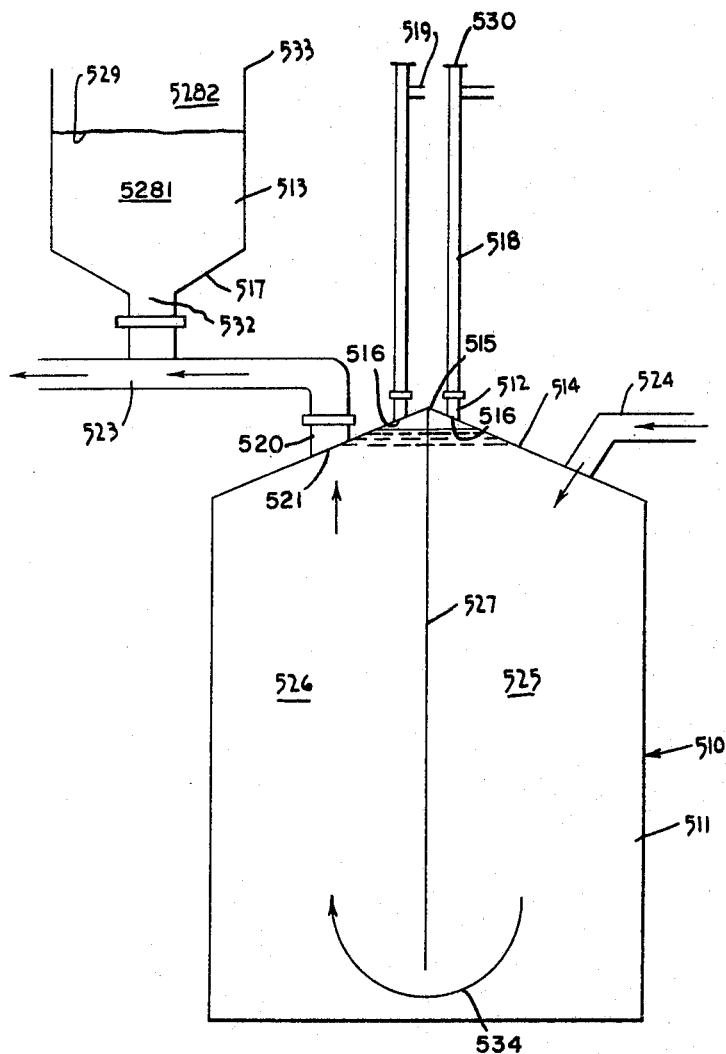
Figure 6:
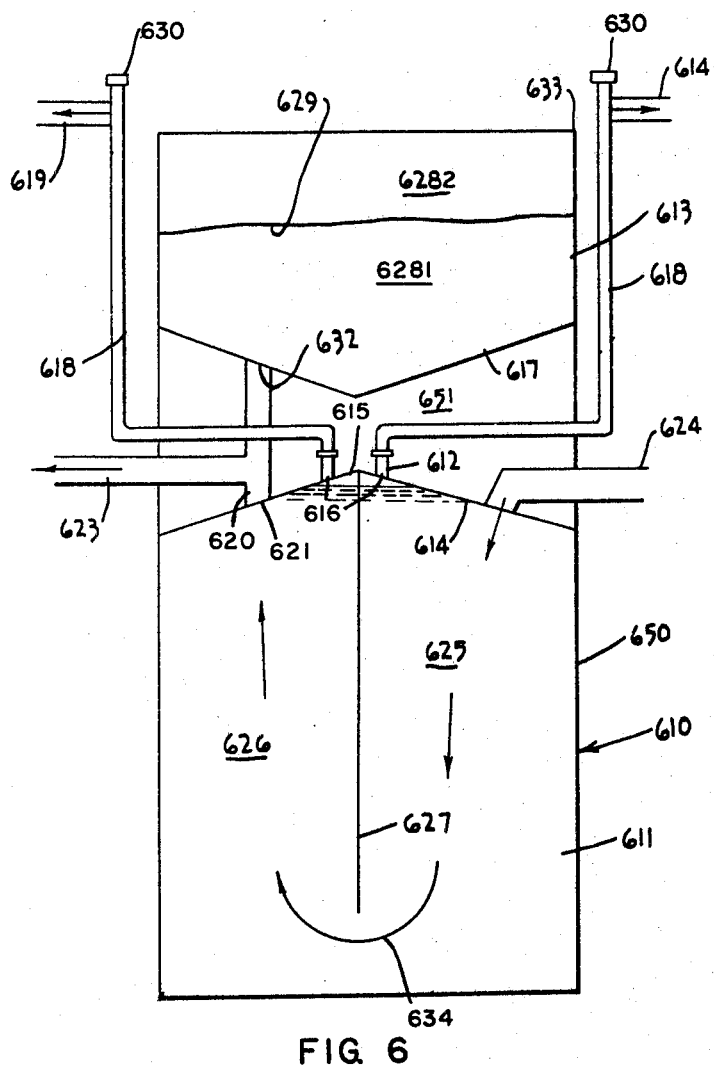

In the accompanying drawings,

FIGURE 1 is a central longitudinal section in schematic form of an apparatus according to one aspect of the present invention, FIGURE 2 is a section along the line II—II of FIGURE 1, FIGURE 3 is the horizontal cross section in schematic form of the main reaction chamber which is an important part of the apparatus according to a still further aspect of the present invention, FIGURE 4 is a central longitudinal section in schematic form of an apparatus according to a still further aspect of the present invention;

FIGURE 5 is a central longitudinal section in schematic form of an apparatus according to yet another aspect of the present invention, and FIGURE 6 is a central longitudinal section in schematic form of an apparatus according to a still further aspect of the present invention.

Turning to FIGURES 1 and 2 it is noted that the reacting vessel 10 includes a main reacting chamber 11, an intermediate gas collecting chamber 12 and an upper surge chamber 13.

Intermediate chamber 12 is in the form of a hollow torus in which its lower wall 14 is upwardly sloping terminating, at its apex, in a capped, well cap 15 which includes radial apertures 151 through which gas in gas well 15 may enter chamber 12, gas well 15 also being provided with gas collecting pipe headers 18 having inlet apertures 16. The upper wall 17 is outwardly, upwardly sloping and is provided at its central vertex with the capped end 152 of gas well 15 which is provided with apertures 153 through which gas standpipes 18 may be fixed in liquid-tight communication therewith. Thus, gas which enters hollow torus intermediate chamber 12 will be eventually be caused to flow upwardly into gas collecting pipe headers 18 and thence discharge via gas outlet conduit 19 either to a scrubber (not shown) or to gas relief.

The hollow torus 12 is provided with an eccentrically disposed aperture conduit extending from the outwardly, downwardly sloping wall 14 to the upwardly, outwardly sloping wall 17. This conduit 20 is thus provided with an inlet thereto 21 at the upper portion of the main chamber 11 at a discharge port 211 to the lower portion of the upper surge tank 13. A pair of perforated plates 22 disposed in spaced apart relation across the diameter of conduit 20 enable liquor in lower main chamber 11 to flow both to upper surge chamber 13 and outwardly via discharge conduit 23.

Lower main chamber 11 is provided with an inlet conduit 24 and a centrally disposed dividing wall 27 to divide the main chamber into an inlet chamber 25 and an outlet chamber 26. It is noted that because of the dividing wall the liquor flow is channeled to flow downwardly in inlet chamber 25 and upwardly in outlet chamber 26.

When the reaction vessel is in operation the upper surge chamber will consist of a liquor portion 281 and a gaseous portion 282 divided by the normal liquor level 29. As shown in FIGURE 1 the gaseous layer is an enclosed one by the provision of a reaction vessel cover 30. However, this cover is an optional feature and the invention is equally operative when the cover is omitted.

Turning now more specifically to FIGURE 3 it is observed that the main reacting chamber 11 is divided into a primary inlet chamber 25 and a primary outlet chamber 26 as well as a pair of interconnecting chambers 31 and 32 by means of submerged weirs 271, 272, 273 and 274. The submerged weirs are so arranged that the liquor entering the primary inlet chamber 25 at the top thereof via inlet conduit 24 is caused to flow downwardly and then through an aperture 275 in the submerged weir 271 in turbulent flow into secondary inlet chamber 31. The liquor then flows upwardly through secondary inlet chamber 31 and cascades over the top 277 of submerged weir 272 in turbulent flow to the upper portion of the secondary outlet chamber 32. The liquor then flows downwardly through secondary outlet chamber 32 and then through aperture 277 in weir 273 in turbulent flow to the lower portion of primary outlet chamber 26. The liquor then flows upwardly through primary outlet chamber 26 until it arrives at inlet 21 to conduit 20 which leads to outlet conduit 23. The liquor may then be directed to the surge tank 13 or may be discharged. Two gas collecting pipes 18 are provided, one at the region of submerged weir 273 between chambers 32 and 26, the other at the region of the submerged weir 271 between chambers 25 and 31.

Turning now to FIGURE 4, it is noted that the apparatus 410 includes a main reaction vessel 411, a surge tank 413 and intermediate gas chambers 412. The main reaction vessel 411 is provided with an upper liquor inlet 424 and an upper liquor outlet 420. The main reaction vessel is also provided with a submerged weir 427 which is spaced from the bottom of the reaction vessel to provide aperture 434. The reaction vessel is provided with an inwardly upwardly sloping roof 414 which is provided, at its apex 415, with gas inlet apertures 416 leading to the gas collecting chambers 412. Gas collecting chambers 412 can conveniently be bellows or expansion joints. The gas collecting chambers 412 discharge directly into gas standpipes 418 which pass through the liquor 4281 contained in the surge tank 413. By passing the standpipes 418 through the liquor in surge tank 413 there is a heat exchanger effect due to the warm gases which maintains the stagnant liquor in the surge tanks at a suitable elevated temperature. The standpipes 418 may be formed of titanium, polyvinyl chloride, or glass or any other suitable chemically resistant material. The gases in standpipe 418 are conducted via conduits 419 either to a scrubber, or to a combustion chamber, or to further chemical manufacturing facilities, or may be discharged to atmosphere. Explosion covers 430 or other safety devices are provided capping the standpipes 418.

Overflow outlet conduit 420 leads via inlet 421 both to a liquor withdrawal outlet conduit 423 and to surge tank 413 via surge tank discharge outlet 432 at the lower downwardly inwardly sloping floor 417 thereof. The normal liquor level in the surge tank 413 is indicated at 429, and consequently the surge capacity of this surge tank is provided by the spacing between the normal liquor level and the top lip 433 of the surge tank 413. The surge tank as shown in FIG. 4 is an open topped surge tank in which the space above the normal liquor level 434 is provided with a non-combustible gas such as air. If desired a cover (not shown) may be provided to cap the surge tank 413.

It is noted that the main reaction tank 411 is substantially filled with liquor since the overflow outlet conduit 420 is situated in the downwardly, outwardly sloping roof 414 thereof. Since the gases are collected at the apex 415 of roof 414 via gas inlet apertures 416 to gas collecting chambers 412, a minimum gas phase is present. It is also to be observed that the normal liquor level 429 in the surge tank 413 is dependent upon the pressure lost in the outlet conduit 423. If the flow in the outlet conduit 423 is not equal to the inflow through the inlet conduit 424, then the liquor level 429 in the surge tank changes. This change in level represents the surges in the system and the liquor level then changes, either by increasing or decreasing the amount of gas 4282. A change in the liquor level also results in a proportional change in the volume of gas in the gas collecting chambers 412 and in the standpipes 418. However, since the cross-sectional area of the gas collecting chambers 412 and the standpipes 418 are each small relative to the cross-sectional area of the surge tank 413, the volume of liquor in the surge tank 413 can change appreciably while still maintaining a relatively small gas volume within the gas collecting chambers 412 and the standpipes 418.

It is noted that, because of the submerged weir 427, the liquor velocity is reduced in the main reaction chamber 411. This, coupled with the turbulent flow through the aperture 434 in the weir 427 enables the gas bubbles to rise and collect adjacent to the apex 415 of sloping roof 414 and to collect in the gas collecting chambers 412 and in standpipes 418. Thus, the liquor 4282 in the surge tank 413 is virtually gas-free and the gases in standpipes 418 can be collected for economic reasons or can be disposed of to minimize hazards.

In the past it has been found that in a system where there are both gas and liquor phases and wherein there were changes in the volume ratio between the gas and liquor phases, then a large initial gas phase was found to be necessary to provide space for the increased liquor volume. It was found that the gas phase would have to be increased due to any decrease in the liquor volume. Where the gas phase was a hazardous gas it was previously necessary to provide large volume fans in order to dilute the gases to below the explosion limit. This, of course, added to the capital operating and maintenance costs. Furthermore, substantially no gases were recovered which added to the cost of the operation and simultaneously provided an air pollution problem.

Referring now to FIGURE 5, it is noted that the apparatus of this aspect of the present invention, generally indicated as reference numeral 510, consists of a main reaction vessel 511, gas collecting chambers 512 and a surge tank 513. Reaction vessel 511 includes a liquor inlet means 524 entering at the upper portion thereof through the inwardly, upwardly sloping roof 514, and an overflow outlet conduit 520 connected to inlet 521 at the upper portion thereof at the inwardly, upwardly sloping roof 514. Inlet 524 is connected to inlet conduit chamber 525 and overflow outlet conduit 520 is connected to outlet chamber 526. Chamber 525 is separated from chamber 526 by a submerged weir 527, but the chambers are interconnected by aperture 534 in weir 527.

The gas collecting chambers 512 are connected directly to main reaction chamber 511 at the apex 518 of sloping roof 514, and communicate through gas inlet apertures 516 and the gas collecting chambers 512 are connected directly to standpipes 518. The gases in standpipes 518 may be withdrawn therefrom through conduits 519. The gas standpipes 518 are provided with explosion covers or other safety means 530. The surge tank 513 is connected to overflow outlet conduit 523 at discharge 532 at the bottom of the downwardly, inwardly sloping floor 517. It is noted therefore that the surge tank 513 is disposed at a vertical level higher than that of the main reaction chamber 511 and spaced horizontally therefrom. The liquor 5281 in the surge tank 513 has a normal liquor level 529 within the surge tank to provide a surge space 5282 between the normal liquor level 529 and the upper lip of the surge tank 533. This space is provided with a non-combustible gas such as air. While not shown, an explosion cover or other safety means (similar to cover 30 in FIGURE 1) may be provided to cap the surge tank.

The operation of the embodiment of FIGURE 5 is similar to that of the embodiment of FIGURE 4.

Turning now to FIGURE 6 it is noted that the apparatus of this embodiment of the present invention shown generally as reference numeral 610 consists of a unitary shell 650 providing therewithin a lower main reaction chamber 611, an upper surge tank 613 and an intermediate void space 651. The main reaction chamber includes liquor inlet conduit 624 entering inlet chamber 625 at the upper portion thereof through the upwardly inwardly sloping roof 614 thereof. The reaction chamber 611 includes an outlet chamber 626, discharging via inlet 621 to overflow outlet conduit 620 from the upper portion thereof at sloping roof 614. Inlet chamber 625 is separated from outlet chamber 626 by a submerged weir 627 which, in turn, is provided with a communicating aperture 634. Upper surge tank 613 is provided in direct liquid communication with main reaction chamber 611 via discharge 632 connected to overflow outlet conduit 620 and connected directly to the downwardly, inwardly sloping floor 617 of the surge tank 613. Overflow outlet conduit 620 also connects to a discharge conduit 623. The liquor 6281 in surge tank 613 has a normal liquor level indicated generally as 629 and the space 6282 above the liquor level 629 is defined between the liquor level 629 and the upper lip 633 of the surge tank 613. The space 6282 contains a non-combustible gas such as air. While not shown, surge tank 613 may be provided with an explosion cover or other safety device to cap it. Gas collecting chambers 612 are connected directly to the apex 615 of sloping roof 614 of the main reaction chamber through gas inlet aperture 616 and these are in direct communication with standpipes 618. The gases in standpipes 618 may be withdrawn via gas conduits 619. The gas standpipes 618 are provided with explosion covers or other safety means 630.

The operation of the embodiment of FIGURE 6 is similar to the operation of the embodiments of FIGURES 4 and 5.

Thus, by a broad aspect of the present invention and particularly when used in its preferred embodiment in a process for the manufacture of chlorate is disclosed and claimed in Canadian Patent No. 741,778 issued Aug. 30, 1966 to G. O. Westerlund, inherent advantages accrue.

Even if the volume of liquor entering the main reaction chamber from the degasifier fluctuates because of fluctuation in the current load in the electrolytic cell, these changes in volume are compensated by the combined reaction chamber and surge tank. The gases which are evolved, or the gases which are present in entrained or occluded form in the reactant liquor originally admitted to the main reaction chamber, are collected by the gas outlet means and the gas zone in the system is minimized by removing the gas by way of gas collecting pipe headers. The gas is then passed either to a scrubber or to gas relief.

Due to the change in velocity, most of the gases which are still entrained in the liquor as they enter through the liquor inlet will be released and discharged as indicated. Thus, there will be a negligible amount of cell gases discharged from the liquor in the surge tank and as a result any explosive hazards will be minimized. Furthermore, the liquor which will be recycled to the cell units via the discharge outlet will contain a minimum amount of gases occluded or dissolved therein.

I claim:

1. In a vessel for carrying out a chemical reaction in a liquid in which the liquid contains entrained and/or occluded gas and including: (I) a main reaction chamber provided with liquor inlet means, liquor outlet means for the outlet of substantially gas-free liquid, and gas outlet means for the outlet of substantially liquid-free gas; (II) a surge tank; (III) a gas collector; (IV) conduit means interconnecting the main reaction chamber with the surge tank for conducting substantially gas-free liquids from the outlet means to the surge tank; and (V) conduit means interconnecting the main reaction chamber with the gas collector for conducting substantially liquid-free gas from the gas outlet means to the gas collector, the improved construction comprising:
   (A) said main reaction chamber (I) being a lower main reaction chamber;
   (B) said surge tank (II) being an upper surge tank;
   (C) said gas collector (III) being an intermediate gas collector disposed vertically above said lower main reacting chamber but vertically below said upper surge tank;
   (D) said conduit means (IV) interconnecting said main reaction chamber (A) with said surge tank (B) to place said main reaction chamber (A) and said surge tank (B) in direct liquid communication exclusively with each other; and
   (E) said conduit means (V) interconnecting said main reaction chamber (A) with the gas collector (C) to place said main reaction chamber (A) and said gas collector (C) in direct gaseous communication exclusively with each other.

2. The vessel of claim 1 wherein a centrally disposed baffle is provided in said main chamber to channel the flow downwardly in a primary inlet portion of said main chamber and to channel the flow upwardly in a primary outlet portion of said main chamber.

3. The vessel of claim 1 wherein:
   (F) said main chamber (A) includes; (i) dividing walls to divide said main chamber into (ii) a primary inlet chamber and, (iii) a primary outlet chamber; and (iv) a secondary inlet chamber and (v) a secondary outlet chamber, for connecting said primary inlet chamber (ii) to said primary outlet chamber (iii);
   (G) an upper inlet means for feeding said primary inlet chamber (ii);
   (H) said dividing wall between said primary inlet chamber (ii) and said secondary inlet chamber (iv) is provided with a lower aperture for placing said chambers in liquid communication with one another;
   (I) said dividing wall between said secondary inlet chamber (iv) and said secondary outlet chamber (v) places said chambers in liquid communication with one another by liquid cascading over the top thereof;
   (J) said dividing wall between said secondary outlet chamber (v) and said primary outlet chamber (iii) is provided with a lower aperture for placing said chambers in liquid communication with one another;
   (K) an upper outlet for discharging liquid from said primary outlet chamber (iii).

4. The vessel of claim 3 wherein an inwardly upwardly sloping wall is provided at the top of said main chamber, the apex of said sloping wall being situated at the central core of said vessel, the apex being at an elevation higher than the elevation of the inlet means between the upper portion of the main chamber and the conduit means (D) between the main chamber (A) and the upper surge chamber (B).

5. The vessel of claim 3 wherein an inwardly lower sloping wall is provided at the bottom of the upper surge tank, the vertex of said sloping wall being at the central core of said vessel, the vertex being at an elevation lower than the elevation of the discharge to said upper surge tank from said conduit means (E) between said main reacting chamber and said upper surge tank.

6. The vessel of claim 3 wherein upstanding gas standpipes are provided which extend from the apex of said sloping walls through said upper surge tank and terminate at an elevation above the reaction vessel.

7. The vessel of claim 3 wherein said upper surge tank is provided with a substantially gas-tight cover.

8. The reacting vessel of claim 3 wherein the vessel is formed of chemically resistant material.

9. The reacting vessel of claim 3 wherein said vessel is lined with a chemically resistant material.

10. The reacting vessel of claim 9 wherein said lining is of rubber, titanium, polyester or glass.

References Cited

UNITED STATES PATENTS

| | | | |
|---|---|---|---|
| 1,513,294 | 10/1924 | Stigall | 55—172 XR |
| 3,243,169 | 3/1966 | Caudle et al. | 23—285 XR |

JAMES H. TAYMAN, Jr., Primary Examiner

U.S. Cl. X.R.

23—85; 55—159, 171